(12) United States Patent
Holoubek

(10) Patent No.: US 10,809,136 B2
(45) Date of Patent: Oct. 20, 2020

(54) THIN FILM SENSOR ELEMENT FOR A RESISTANCE THERMOMETER

(71) Applicant: Innovative Sensor Technology IST AG, Ebnat-Kappel (CH)

(72) Inventor: Jiri Holoubek, Roznov (CZ)

(73) Assignee: Innovative Sensor Technology IST AG, Ebnet-Kappel (CH)

( * ) Notice: Subject to any disclaimer, the term of this patent is extended or adjusted under 35 U.S.C. 154(b) by 208 days.

(21) Appl. No.: 16/089,585

(22) PCT Filed: Apr. 12, 2017

(86) PCT No.: PCT/EP2017/058631
§ 371 (c)(1),
(2) Date: Sep. 28, 2018

(87) PCT Pub. No.: WO2017/178463
PCT Pub. Date: Oct. 19, 2017

(65) Prior Publication Data
US 2019/0086274 A1 Mar. 21, 2019

(30) Foreign Application Priority Data
Apr. 12, 2016 (DE) .......................... 10 2016 106 675

(51) Int. Cl.
*G01K 1/16* (2006.01)
*G01K 7/18* (2006.01)
*H01C 7/00* (2006.01)

(52) U.S. Cl.
CPC ............... *G01K 7/183* (2013.01); *G01K 7/18* (2013.01); *H01C 7/006* (2013.01)

(58) Field of Classification Search
CPC .......... G01K 7/16; G01K 13/00; H01C 7/008; H01C 7/041; H01C 7/006; H01C 1/14; H01C 1/028; H01L 28/20; H01L 21/67248
(Continued)

(56) References Cited

U.S. PATENT DOCUMENTS

| 3,781,749 A | 12/1973 | Iles et al. |
| 6,341,892 B1 * | 1/2002 | Schmermund ........... G01K 1/08 338/22 R |

(Continued)

FOREIGN PATENT DOCUMENTS

| DE | 4007129 A1 | 9/1991 |
| DE | 102004034185 B3 | 1/2006 |

(Continued)

OTHER PUBLICATIONS

Search Report for German Patent Application No. 10 2016 106 675.3, German Patent Office, dated Nov. 21, 2016, 6 pp.

(Continued)

*Primary Examiner* — Gail Kaplan Verbitsky
(74) *Attorney, Agent, or Firm* — Mark A. Logan; Endress+Hauser (USA) Holding Inc.

(57) ABSTRACT

The present disclosure relates to a thin film sensor element for determining and/or monitoring temperature. For this purpose, a resistive structure is provided, which is arranged in a resistive region on a substrate. The resistive structure is so formed that a first section of the resistive structure branches at a first reference point into two branches, and that a second section of the resistive structure branches at a second reference point into two other branches. In a contact region, the four branches are connected with four intermediate conductors in four contact areas, which are insulated from one another. In this way, the thin film sensor element (Continued)

is a real four conductor sensor element, wherein the reference points of the four conductor circuit lie within the resistive region. The resistance thermometer with the thin film sensor element of the invention is distinguished by a high accuracy.

19 Claims, 2 Drawing Sheets

(58) Field of Classification Search
USPC .................. 374/163, 185, 208; 338/22 R
See application file for complete search history.

(56) References Cited

U.S. PATENT DOCUMENTS

| | | | | |
|---|---|---|---|---|
| 6,354,736 B1* | 3/2002 | Cole | ................ | G01K 7/183 |
| | | | | 338/22 R |
| 6,666,578 B2* | 12/2003 | Gibbs | ................ | G01K 7/16 |
| | | | | 374/142 |
| 7,233,226 B2* | 6/2007 | Zitzmann | ................ | G01K 7/18 |
| | | | | 338/25 |
| 7,249,409 B2* | 7/2007 | Landsberger | .......... | H01C 13/02 |
| | | | | 204/192.21 |
| 7,339,455 B2* | 3/2008 | Fujita | ................ | G01K 7/18 |
| | | | | 338/25 |
| 7,674,038 B2* | 3/2010 | Heine | ............. | H01L 21/67248 |
| | | | | 219/200 |
| 7,746,212 B2* | 6/2010 | Zitzmann | ............... | G01K 7/186 |
| | | | | 338/22 R |
| 7,916,994 B2* | 3/2011 | Todo | ................ | H04N 19/70 |
| | | | | 386/244 |
| 8,201,992 B2* | 6/2012 | Horovitz | ............. | G01N 27/123 |
| | | | | 374/16 |
| 8,267,578 B2* | 9/2012 | Kamata | ................ | H03B 5/04 |
| | | | | 374/136 |
| 9,863,797 B2* | 1/2018 | Vernochet | ............. | G01F 1/6965 |
| 10,094,717 B2* | 10/2018 | Chen | ................ | G01K 7/24 |
| 2003/0185270 A1* | 10/2003 | Kawai | ................ | G01F 1/6845 |
| | | | | 374/40 |
| 2005/0265425 A1* | 12/2005 | Heldberg | ............. | G01F 23/246 |
| | | | | 374/185 |
| 2007/0229068 A1* | 10/2007 | Sasaki | ................ | G01R 33/09 |
| | | | | 324/252 |
| 2011/0237001 A1* | 9/2011 | Hasebe | ................ | H01L 25/50 |
| | | | | 438/4 |
| 2019/0392689 A1* | 12/2019 | Schwarz | ............... | G08B 13/126 |

FOREIGN PATENT DOCUMENTS

| | | |
|---|---|---|
| DE | 102007023434 A1 | 11/2008 |
| DE | 102009007940 A1 | 9/2010 |
| DE | 102012204817 A1 | 9/2013 |
| EP | 0446667 A2 | 9/1991 |
| EP | 2261624 A1 | 12/2010 |
| JP | 10026559 | 1/1998 |

OTHER PUBLICATIONS

International Search Report for Patent Application No. PCT/EP2017/058631, WIPO, dated May 16, 2017, 12 pp.

* cited by examiner

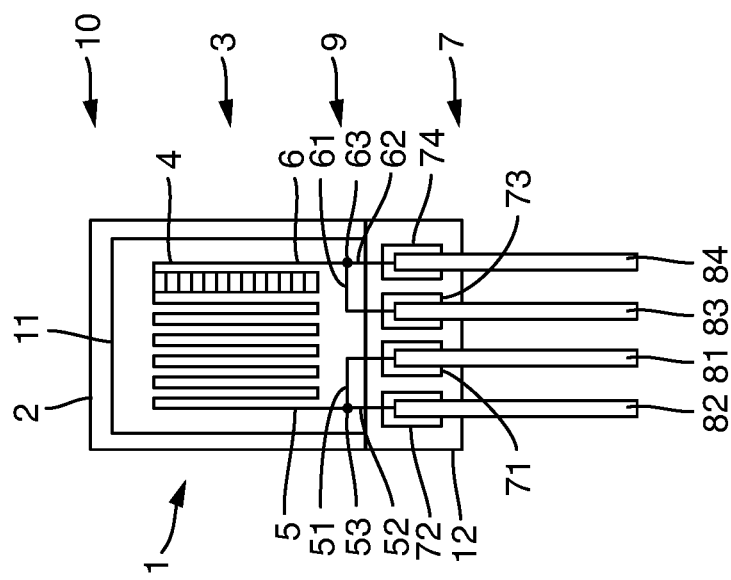
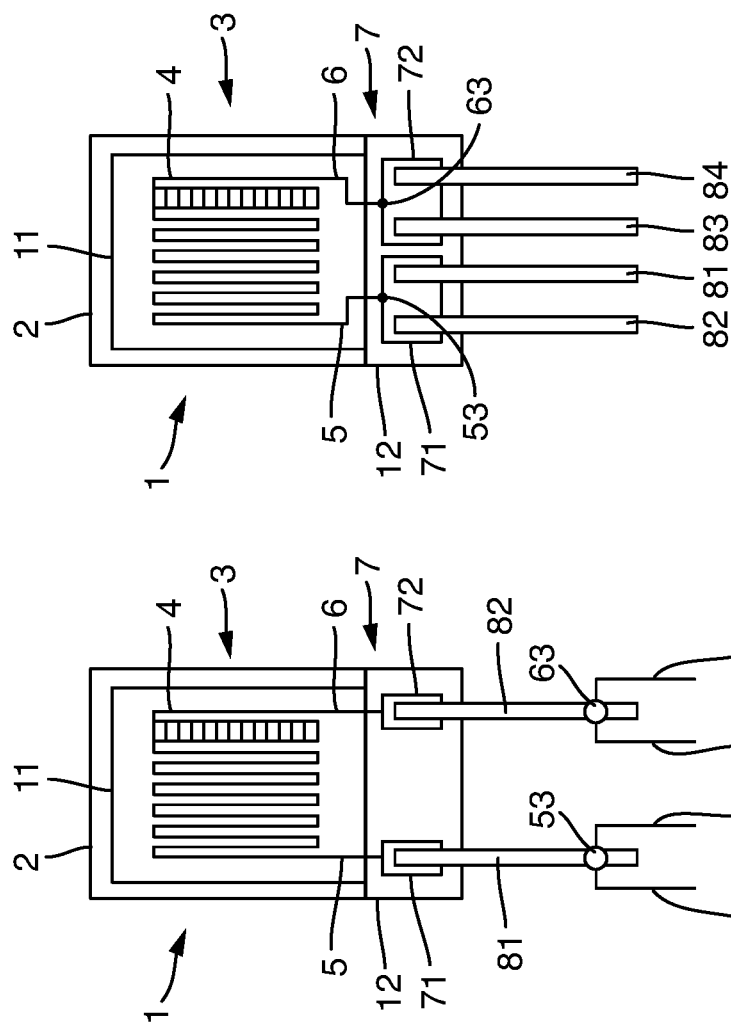

THIN FILM SENSOR ELEMENT FOR A RESISTANCE THERMOMETER

CROSS-REFERENCE TO RELATED APPLICATIONS

The present application is related to and claims the priority benefit of German Patent Application No. 10 2016 106 675.3, filed on Apr. 12, 2016, and International Patent Application No. PCT/EP2017/058631, filed on Apr. 12, 2017, the entire contents of which are incorporated herein by reference.

TECHNICAL FIELD

The invention relates to a thin film sensor element for determining and/or monitoring temperature, as well as to a resistance thermometer having the thin film sensor element.

BACKGROUND

Materials referred to as cold conductors have proved to be especially suitable for the construction of resistance thermometers, since the resistance of cold conductors increases in first order linearly with rising temperature. Platinum is a preferred cold conductor material, since platinum can have up to a quadratic dependence of resistance on temperature. Resistance thermometers are usually so embodied that they have a certain nominal resistance at a reference temperature of 0° C. Thus, quite popular are the resistance thermometers referred to as Pt100 (100 ohm) and Pt1000 (1 kOhm).

Due to their miniaturizability and fast response time, resistance thermometers based on thin film sensor elements are becoming increasingly popular compared with wound resistance thermometers. Thin film sensor elements are composed, in such case, of a thin resistive structure with a thickness of a few micrometers and arranged on an electrically insulating substrate (for example, a ceramic). Usually, the resistive structure is insulated and protected by a cover layer (for example, of glass). The resistance is essentially determined by the length of the resistive structure. In such case, the resistive structure on the substrate has, as a rule, a meander shaped course, in order so to achieve the length required for a measurable resistance value. Such thin film resistance thermometers are produced by the E+H group of companies in different embodiments and are sold for use in varied applications.

In the implementation of the thin film sensor element, the resistive structure with a certain length is won, firstly, from a resistive layer by a coarse structuring. For the fine tuning to a certain resistance value, trim grindings are performed. The resistive layer is structured, for example, by etching or with lasers. In practice, this procedure is very demanding, alone because temperature has to be controlled. Often, the resistive structure is formed at a temperature different from the nominal temperature, so that calculations have to be used to be sure that the structure will have the correct properties at the nominal temperature.

Due to the demanding implementation, production fluctuations in the manufacturing of resistance thermometers can lead to temperature measurement errors. Now, a manufacturer should be able to warrant that a resistance thermometer meets a standardized accuracy class. Thus, the European standard DIN EN 60751:2009-05 classifies Pt resistance thermometers based on an allowed maximum tolerance $\Delta t$ of the measured temperature value from the true temperature value:

$$\Delta t = t0 + \delta |t|$$

In such case, $|t|$ is the ambient temperature, while $t0$ and $\delta$ are defined within the accuracy class. In the frequently used class B, for example, $t0=0.3°$ C. and $\delta=0.005$, so that at an ambient temperature of 100° C. a maximum tolerance of $\Delta t=\pm 0.8°$ C. is permitted. In the class AA (which corresponds to the earlier ⅓ DIN standard), in contrast, with $t0=0.1°$ C. and $\delta=0.0017$, only a maximum tolerance of $\Delta t=\pm 0.27°$ C. is permitted. The more demanding implementations are thus accompanied by very high requirements for accuracy of the resistance thermometers.

If cold conductors are applied for low temperature applications, i.e. at environmental temperatures of less than 0° C., then a high accuracy requirement for the temperature measurement means that a high accuracy of the resistance measurement must be achieved at very small resistances. Especially in this case, consequently, an exact temperature measurement is very demanding.

Typically, the electrical contacting of the resistive structure extending in a resistance region of a thin film sensor element occurs via two intermediate conductors, i.e. in a two conductor contacting. In such case, in a contact region in, in each case, two mutually isolated contact areas, a first section of the resistive structure is connected with a first intermediate conductor and a second section of the resistive structure is connected with a second intermediate conductor. The two intermediate conductor lead then away from the contact region protected with a cover layer. Connected to these two intermediate conductors led away from the contact region are then two connection conductors. Two reference points of the thus created four conductor circuit are formed by connecting the four connection conductors in pairs with the two intermediate conductors of the thin film sensor element. The so formed four conductor circuit is suited for very exact resistance measurements, since in the case of a constant electrical current source and a voltage measuring device having a very high internal resistance, only the resistance present between the reference points is measured, without there being an influence of the connection conductors.

In the case of above described, usual, four conductor circuit, the two reference points of the four conductor circuit lie, however, removed from the resistance region and the contact region, since the reference points of the four conductor circuit are formed only by the connection of the outwardly leading, intermediate conductors with the, in each case, two connection conductors. The measured resistance between the reference points is established, consequently, from the total resistance of the resistive structure, the connections of the resistive structure with the intermediate conductors in the contact areas, as well as the resistance of the intermediate conductors.

For such a two conductor contacting, consequently, high requirements for accuracy of the resistance measurement translate automatically into high requirements for accuracy in the case of the implementation of the total resistance composed of the resistive structure, the connection of the resistive structure with the intermediate conductors in the contact areas, as well as the intermediate conductors themselves. A small fluctuation in the properties of the intermediate conductors (e.g. their lengths) can, consequently, have a large effect on the resistance of the resistance measurement and therewith lastly on the accuracy of the resistance thermometer.

A further influence on the accuracy can also be present because of the encapsulation of the resistive structure between the substrate and the covering. This results from the fact that the combination of substrate, resistive structure, contact areas and cover layer has a different coefficient of thermal expansion than the resistive structure. Strong temperature fluctuations lead therewith unavoidably to strong mechanical stresses, which act on the resistive structure. Since cold conducting materials, such as, for example, platinum, always also have strong piezoresistive properties, these mechanicals stresses can, in turn, react on the resistance of the resistive structure. In this way, lastly, uncontrollable hysteresis effects appear in the resistance/temperature characteristic line/curve. The hysteresis effects can be reduced to a certain degree by exposing the encapsulated thin film sensor element after the manufacturing to a number of heating- and cooling cycles.

Another possibility is to exclude such mechanical stresses from the start. To this end, the coefficients of thermal expansion of the substrate and the covering must be matched to the coefficient of thermal expansion of the resistive structure. This approach is followed in DE 00 10 2007 02 34 34 A1. Such a matching of the coefficients of thermal expansion is complicated, however. In such case, it is to be kept in mind that, especially in the contact region, the influence of different coefficients of thermal expansion is especially great. This is caused by the large thickness of the thin film sensor element in the contact region. The greater thickness in the contact region is required, for example, because of the weld locations for connection of the resistive structure with the intermediate conductors in the contact areas. It is especially large relative to the thickness of the thin film sensor element in the resistive region.

In summary, the accuracy of a resistance thermometer having a thin film sensor element is not only determined by the design of the resistive structure, but, instead, also decisively by the intermediate conductor as well as the encapsulation of the resistive structure between substrate and cover layer. This is essentially caused by the contacting of the thin film sensor element, which leads to the fact that the reference points of the four conductor circuit lie removed from the resistive structure of the thin film sensor element. In this way, a large part of a high theoretical accuracy, which could be achieved by a very careful design of the resistive structure, is destroyed.

SUMMARY

An object of the invention is, therefore, to provide a thin film sensor element and a resistance thermometer for highly accurately determining and/or monitoring temperature.

The object is achieved by a thin film sensor element for determining and/or monitoring temperature,
wherein the thin film sensor element has a substrate,
wherein in a first region of the substrate a resistive region with a resistive structure is provided,
wherein the resistive structure has a temperature dependent electrical resistance, wherein the resistive structure is so formed,
that, by a branching of a first section of the resistive structure into a first branch and into at least one additional, second branch connected in parallel with the first branch, a first reference point is formed in the resistive region and
that, by a branching of a second section of the resistive structure into a first branch and into at least one additional branch connected in parallel with the first branch, a second reference point is formed in the resistive region,
wherein on the substrate at least one region is provided adjoining the resistive region and serving as contact region with contact areas electrically insulated relative to one another, wherein in the contact region
the first branch of the first section of the resistive structure is connected with a first intermediate conductor in a first contact area,
the second branch of the first section of the resistive structure is connected with a second intermediate conductor in a second contact area,
the first branch of the second section of the resistive structure is connected with a third intermediate conductor in a third contact area and
the second branch of the second section of the resistive structure is connected with a fourth intermediate conductor in a fourth contact area.

The thin film sensor element, which can be applied for determining and/or monitoring temperature, is characterized by features including that, by the branching of the first and second sections of the resistive structure into the, in each case, at least two branches connected in parallel with one another, two reference points are formed, which are arranged within the resistive region (i.e. the region, in which the resistive structure extends). Since the, in total, at least four branches are connected with at least four intermediate conductors in contact areas isolated from one another in the contact region, the thin film sensor element of the invention is a real four conductor sensor element.

Via two of the at least four intermediate conductors, each of which is connected with the first and the second section of the resistive structure, in each case, via one of the two branches of a section, the resistive structure of the thin film sensor element can be supplied with a constant electrical current. Using the two additional intermediate conductors, which are connected with the two additional branches of the first and second sections of the resistive structure, voltage dropping across the two reference points can be measured with a voltage measuring device. In this way, the thin film sensor element of the invention can be operated in a real four conductor circuit. Real means here that only the resistance of the resistive structure between the first and second reference points can be measured with the thin film sensor element of the invention, wherein the two reference points of the resistive structure are components of the four conductor circuit itself.

The reference points are thus not, such as usual, formed only by the connection of two intermediate conductors with, in each case, two connection conductors at locations removed from the thin film sensor element. Thus, in the case of the invention, influences of the intermediate conductors on the voltage signal of the four conductor circuit are essentially excluded.

Furthermore, in the case of the thin film sensor element of the invention, the influence of the contact region, for instance, from mechanical stresses in the region of the contact areas, on the voltage signal of the four conductor circuit is also minimized. This is because of the four contact areas insulated from one another, in which the different, parallel connected branches of the resistive structure are contacted with the intermediate conductors.

For these reasons, the above mentioned influences on the accuracy of the resistance measurement are eliminated from the beginning in the case of the thin film sensor element of the invention. Thus, a thin film sensor element is provided, which, in simple manner, enables temperature measurements of high accuracy.

In given cases in the context of the invention, yet more branches of the first and second sections of the resistive structure are provided, which, in each case, are connected in parallel with the first two branches. The additional branches can be connected in additional contact areas with additional intermediate conductors. In this way, for example, a plurality of simultaneous voltage measurements can be performed.

The branching of the first and second sections of the resistive structure into parallel branches and the forming of the reference points can occur in the context of the structuring of the resistive layer. In such case, there is, in principle, no limitation on the arrangement of the two reference points within the resistive region. Depending on type of thin film sensor element, or the number of layers, their dimensioning and utilized materials, it is possible, in such case, to achieve a preferred arrangement of the reference points.

In a further development of the invention, the first and/or the second reference point are/is arranged in an end region of the resistive region facing the contact region. In this further development, the reference points can thus be arranged, for example, near to the connection of the resistive region with the adjoining contact region.

In an alternative further development of the invention, the first and/or the second reference point are/is arranged in a region,
which lies between an end region of the resistive region away from the contact region and an end region of the resistive region near the contact region. For example, an opportunity is presented to arrange the reference points centrally between the end region of the resistive region away from the contact region and the end region of the resistive region near the contact region. These arrangements can be advantageous when, for example, high mechanical stresses are present in the transition between resistive region and contact region. Another opportunity is to provide two different contact areas, which adjoin oppositely lying end regions of the resistive region.

In a further development of the invention, the resistive structure is composed of a cold conducting material. Preferably, the cold conductor is essentially platinum and/or nickel.

In an additional further development of the invention, a first cover layer is provided in the resistive region for covering the resistive structure. In such case, it is also an option to form the cover layer of different layers, wherein the layer contacting the resistive layer is composed of an essentially non-conducting, or insulating, material, for example, a glass and/or a ceramic.

In an embodiment of the invention, a second cover layer is provided in the contact region. Also this cover layer can be formed of different layers In an additional embodiment of the invention, the thickness of the thin film sensor element in the resistive region is less than in the contact region. In such case, the thickness in the resistive region is typically about a factor of ½-4 less than in the contact region.

As a result of the position of the reference points of the thin film sensor element of the invention, influences from mechanical stresses in the contact region are essentially excluded. There are, however, mechanical stresses still remaining in the resistive region. If these are also excluded, an especially exact resistance thermometer can be formed with the thin film sensor element of the invention. Therefore, an especially preferred further development of the invention provides that the totality of substrate, resistive structure and cover layer has in the resistive region an effective coefficient of thermal expansion $TCE_{eff}$, which is greater than or equal to the coefficient of thermal expansion of the material of the resistive structure as bulk-metal.

The effective coefficient of thermal expansion $TCE_{eff}$ is essentially given by the following formula:

$$TCE_{eff} = \frac{\sum_{i=1}^{N} TCE_i * d_i * E_i * F_i}{\sum_{i=1}^{N} d_i * E_i * F_i},$$

wherein N is the number of components of the thin film sensor element, wherein the index i refers to the individual components, wherein $TCE_i$ is the coefficient of thermal expansion, di the thickness and Ei the elasticity of the individual components, and wherein Fi is a geometric factor. The substrate can also be of a plurality of layers, wherein at least the surface of the substrate is non-conducting.

The components of the thin film sensor element are in this further development of the invention thus embodied and matched to one another in such a manner that the resulting effective coefficient of thermal expansion $TCE_{eff}$ corresponds to a predeterminable value. The effective coefficient of thermal expansion can be set by the choice of materials as well as the number and dimensioning of the layers. The substrate has in this further development a thermal coefficient of expansion, which is significantly greater than 10.5 ppm/K. In such case, reference is made to the disclosure of DE 00 10 2007 02 34 34 A1.

In a further development of the invention, the substrate is an at least partially ceramic substrate.

In an additional further development of the invention, the substrate comprises aluminum oxide and/or zirconium oxide.

In an embodiment of the invention, the surface layer of the substrate is non-conducting, wherein the non-conducting surface layer of the substrate has a minimum thickness of 10 micrometer.

In an additional embodiment of the thin film sensor element, the intermediate conductors are all of the same material. For example, in this embodiment, the intermediate conductors can be of the same material as the resistive layer. An advantage of this embodiment is that no or only minimal thermoelectric effects occur in the contact region.

In another embodiment, the material of the intermediate conductors can be other than that of the resistive layer. Possibilities, in such case, include, for example, nickel, silver, or metal alloys such as German silver, which are used for compensating lines in the case of platinum thermocouples. In this way, only small thermovoltages are produced. Especially, the material for the intermediate conductors can be so selected that it corresponds to that of the connection conductors. Referred to as connection conductors in the context of the invention are those conductors, which for operating the thin film sensor element in four conductor circuit mode are connected to the outwardly leading intermediate conductors of the thin film sensor element. This embodiment is additionally advantageous for minimizing thermoelectric effects, since the temperature gradient is, as a rule, less in the contact region than in the region of the connections between the intermediate conductors and the connection conductors.

In an additional embodiment, the resistive structure has a layer thickness of 0.1 micrometer-10 micrometer.

Typically, the weld locations of the contact areas require a certain thickness of the cover layer of the contact region, so that the cover layer in the contact region is significantly greater than the cover layer in the resistive region. In an additional embodiment of the invention, consequently, the cover layer in the resistive region has a maximum layer thickness of 50 micrometer, while the cover layer in the contact region has a maximum layer thickness of 2.0 millimeter.

The invention additionally resides in a resistance thermometer having the thin film sensor element of the invention. In such case, the resistance thermometer includes a control/evaluation unit, wherein the intermediate conductors of the thin film sensor element are connected with the control/evaluation unit, and wherein the control/evaluation unit is embodied by means of the at least four intermediate conductors of the thin film sensor element to operate in a four conductor circuit, to ascertain the resistance of the resistive structure between the first reference point and the second reference point, and to determine from the ascertained resistance the temperature present at the resistive structure.

In summary, the invention relates to a thin film sensor element for determining and/or monitoring temperature. In this regard, a resistive structure is provided, which is arranged on a substrate in a resistive region. The resistive structure is so formed that a first section of the resistive structure branches at a first reference point into at least two branches, and that a second section of the resistive structure branches at a second reference point into at least two other branches. In a contact region, the four branches are connected with four intermediate conductors in four contact areas, which are insulated from one another. Therefore, the thin film sensor element is a real four conductor sensor element, wherein the reference points of the four conductor circuit lie within the resistive region. The resistance thermometer having the thin film sensor element of the invention is distinguished by high accuracy.

BRIEF DESCRIPTION OF THE DRAWINGS

The invention will now be explained in greater detail based on the appended drawing figures as follows:

FIGS. 1a-c show plan views of thin film sensor elements of the state of the art and the invention;

DETAILED DESCRIPTION

Figure 2:
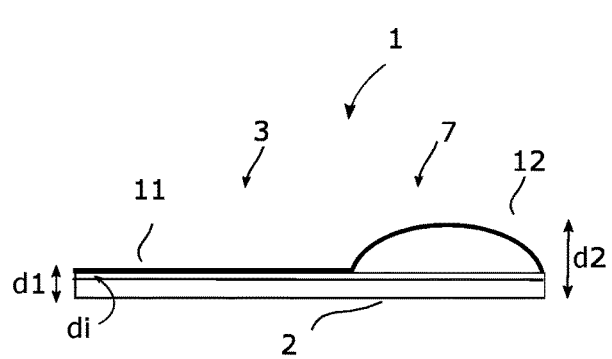
FIG. 2 shows a side view of the thin film sensor element of the invention.

FIG. 1a shows a schematic plan view of a thin film sensor element 1 of the state of the art. The thin film sensor element 1 comprises the resistive structure 4 arranged on the substrate 2 and extending with meander shape in the resistive region 3. Shown also are the trim grindings in the right edge area of the resistive region 3. Bordering on the resistive region 3 is the contact region 7, in which the first section 5 of the resistive structure 4 is connected with the first intermediate conductor 81 in the first contact area 71, and in which the second section 6 of the resistive structure 4 is connected with the second intermediate conductor 82 in the second contact area 72. Resistive region 3 is protected with the first cover layer 11 covering the resistive structure 4 and the contact region is protected with the second cover layer 12 covering the contact areas 71,72. Outside of the contact region 7, the two intermediate conductors 81,82 are connected in the two reference points 53, 63 with, in each case, two connection conductors 53a,53b, 63a, 63b. In this thin film sensor element 1 of the state of the art, the total resistance between the reference points 53,63 is determined by the resistance in the resistive region 4, the resistance in the contact region 7 and the resistance of the intermediate conductors 81,82.

FIG. 1b shows a schematic view of a further thin film sensor element 1 of the state of the art. In contrast to the thin film sensor element 1 of FIG. 1a, the thin film sensor element 1 here has a four conductor connection. The four conductor connection is, however, formed by the connection of the first section 5 of the resistive structure 4 with a first pair of intermediate conductors 81,82 and by the connection of the second section 6 the resistive structure 4 with a second pair of intermediate conductors 83,84, wherein the reference points 53,63 of the four conductor circuit are also arranged in the contact areas 71,72 of the contact region 7. In this way, also the part of the resistive structure extending in the contact region contributes to the total resistance between the two reference points 53,63 of this thin film sensor element.

A plan view of an example of an embodiment of the thin film sensor element 1 of the invention is shown in FIG. 1c. In contrast to the thin film sensor elements 1 of the state of the art, the resistive structure 4 in the resistive region 3 is structured in the following way: The first section 5 branches into a first branch 51 and into a second branch 52, wherein the second branch 52 is connected in parallel with the first branch 51. Also, the second section 6 branches into a first branch 61 and into a second branch 62, wherein the second branch 62 is connected in parallel with the first branch 61. All branches 51,52,61,62 are connected in the contact region 7 with intermediate conductors 81,82,83,84 in contact areas 71,72,73,74, which are insulated from one another. The intermediate conductors 81,82 (and 83,84) connected with the branches 51,52 (and 61,62) are connected in parallel with one another at the reference points 53,63. In this way, the resistive structure 4 is contactable in a four conductor circuit based on the intermediate conductors 81,82,83,84, wherein in the thin film sensor element 1 of the invention the total resistance is composed only of the resistance of the resistive structure 4 in the resistive region 3 between the two reference points 53,63. The intermediate conductors 81,82, 83,84 and the contact region 7 do not contribute to the total resistance. This results from the fact that in the case of the thin film sensor element 1 of the invention the reference points 53,63 are in the resistive region 3.

In this example of an embodiment of the invention, the reference points 53,63 are arranged in an end region 9 of the resistive region 3 near the contact region 7. In the context of the invention, it is, however, also possible to arrange one or both reference points 53,63 in an end region 10 of the resistive region 3 away from the contact region 7. Additionally, it is possible to provide a plurality of contact regions 7, other branches connected in parallel and, in given cases, other contact areas.

FIG. 2 shows a side view of the thin film sensor element 1. For purposes of simplification, the intermediate conductors 81,82,83,83 are not shown. While FIG. 2 is, indeed, in not to scale, it does indicate that the layer thickness d1 of the thin film sensor element 1 in the resistive region 3 is less than the layer thickness d2 of the thin film sensor element 1 in the contact region 7. Due to the weld locations in the contact areas 71,72,73,74, the second cover layer 12 in the contact region 7 is significantly larger than the first cover layer 11 in the resistive region 3. For this reason, in the case of temperature changes, as a rule, mechanical stresses in the contact region 7 are greater than in the resistive region 3.

By arranging the reference points 53,63 in the resistive region according to the invention, these mechanicals stresses have, however, a negligible influence on the resistance measurement, so that only the significantly smaller mechanical stresses in the resistive region 3 can influence the resistance measurement in the case of a resistance structure 4 of a material with piezoresistive properties.

In the variant of the invention, in which the effective coefficient of thermal expansion $TCE_{\mathit{eff}}$ is greater than or equal to that of the resistive structure as bulk-metal, the matching of the coefficients of thermal expansion excludes piezoresistive effects from the beginning, since, in the case of large temperature fluctuations, the encapsulation (substrate 2, first and second cover layers 11,12) of the resistive structure 4 expands at least to the same degree as the resistive structure 4. In this regard, the substrate 2 and/or the cover layer 11,12 can be composed of a plurality of layers. In such case, in a variant of the invention, the non-conducting surface layer of the substrate 2 should have a minimum layer thickness $d_{\mathit{insul}}$ of 1 micrometer.

Figure 3:
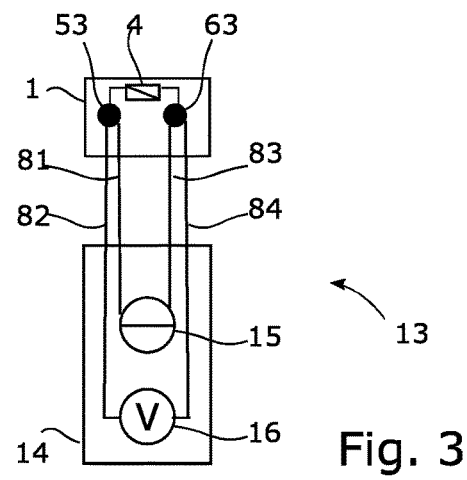
FIG. 3 shows a plan view of the resistance thermometer of the invention.

FIG. 3 shows a plan view of the resistance thermometer 13 of the invention. In addition to the thin film sensor element 1 with the resistance structure 4, the resistance thermometer 13 has a control/evaluation unit 14. The control/evaluation unit 14 includes, in such case, electronic components, which operate the thin film sensor element 1, evaluate its electrical signals and ascertain a temperature therefrom. In this regard, the intermediate conductors 81,82, 83,84 are connected with the control/evaluation unit 14. In this example of an embodiment, an electrical current source 15 is provided, which supplies the resistive structure 4 with an electrical current via the two intermediate conductor 81,83. Additionally, a voltage measuring device 16 is provided, which, using the two additional intermediate conductors 82,84, determines voltage falling across the resistive structure 4 between the reference points 53,63. For purposes of simplification, the resistive region 3 and the contact region 7 are not shown here; the reference points lie, however, also here according to the invention in the resistive region. The control/evaluation unit 14 determines based on the electrical current supplied from the electrical current source 15 and the voltage drop, the resistance of the resistive structure 4 between the reference points 53,63. Based on resistance characteristic lines, or curves, stored in the control/evaluation unit 14, then the temperature can be determined.

Figure 4A:
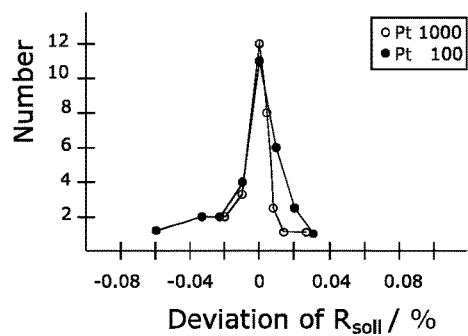
FIGS. 4a-d show graphs illustrating the accuracy of the resistance thermometer of the invention.
Figure 4B:
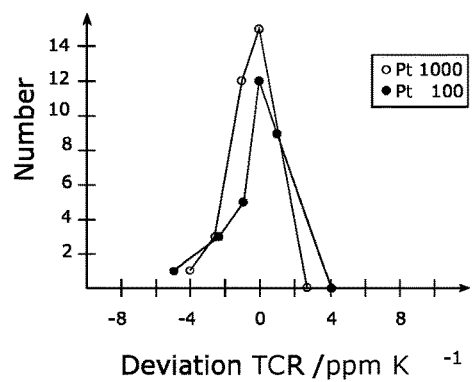
Figure 4C:
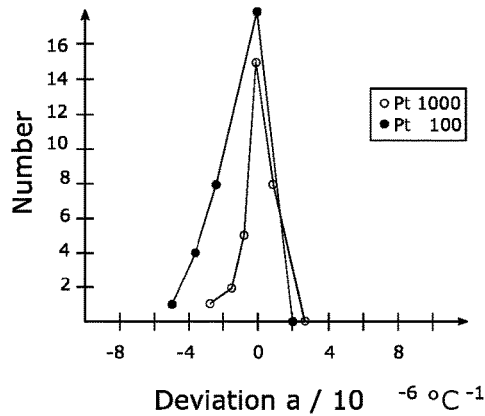

FIGS. 4a-4c show results of experimental investigations relative to the accuracy of the resistance thermometer 13 of the invention, wherein the form of embodiment, Pt100 (black dots), and the form of embodiment, Pt1000 (open dots), were examined. Studied, in each case, were a series of resistance thermometers 13 of equal construction. FIGS. 4a-d show different quality criteria for the accuracy of the resistance thermometers 13. In such case, plotted on the x axis is the deviation from a desired value. Plotted on the y axis is the frequency, or number, of resistance thermometers 13, for which a certain deviation was detected. Using these frequency distributions, then via the investigations relative to the manufacturing tolerance of same type resistance thermometers 13, the quality class of the resistance thermometer 13 of the invention can be estimated.

FIG. 4a shows, in such case, the frequency distribution of the deviation of the resistance value of the resistance thermometer 13 from the nominal resistance value $R_{nom}$ (i.e. 100 ohm and 1000 ohm) in percent. The experimental investigations show that a large fraction of the resistance thermometers 13 of the invention deviate by less than 0.02% from the nominal resistance value $R_{nom}$.

FIG. 4b shows the frequency distribution of the deviation of the average temperature coefficient of resistance (TCR-value) from a desired value $TCR_{des}$. The average temperature coefficient of resistance, in such case, is defined as the difference between the resistances divided by the resistance at 0° C. and divided by the difference between the end temperatures in the measuring range between 0° C. and 100° C., thus:

$$TCR = \frac{R_{T1} - R_{T2}}{(T_1 - T_2) \cdot R_{T2}},$$

wherein is: $T_1=100°$ C., $T_2=0°$ C., and wherein $R_{T1}$ is the resistance at $T_1$ and $R_{T2}$ the resistance at $T_2$.

It can be seen that the resistance thermometer 13 of the invention has a deviation of the TCR-value from a desired value $TCR_{des}$ of under 5 ppm $K^{-1}$.

The resistance value ascertained by the resistance thermometer 13 in the temperature range $0°<T<200°$ C. is described by a resistance characteristic curve of second order:

$$R(T)=R_{T=0° C.}(1+a \times T+b \times T^2)$$

Figure 4D:
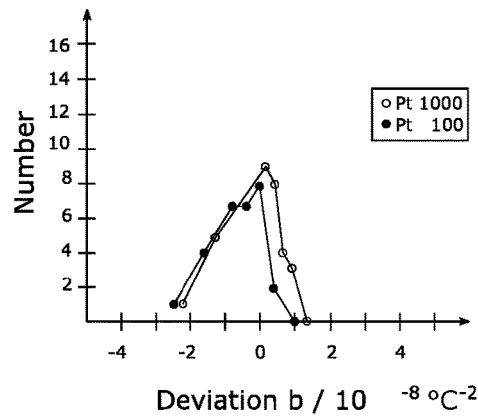

In FIGS. 4c and 4d, the frequency distributions of the deviation of the linear coefficient (FIG. 4c) and the square coefficient (FIG. 4d) of the resistance characteristic curve are plotted. It can be seen that the linear coefficient a of the resistance characteristic curve deviates by less than $10^{-5°}$ $C.^{-1}$ from a desired value $a_{des}$ (see FIG. 4c) and that the square coefficient b of the resistance characteristic line deviates by less than $10^{-7°}$ $C.^{-2}$ from a desired value $b_{des}$.

The experimental investigations show that the resistance thermometer 13 of the invention is highly accurate. Based on experience, this means that under usual production conditions a resistance thermometer 13 with the thin film sensor element 1 of the invention lies in over 50% of the cases in the accuracy class ⅓ B per DIN EN 60751:2009-05.

In the especially advantageous embodiment of the thin film sensor element 1 of the invention, in which the coefficients of thermal expansion $TCE_{\mathit{eff}}$ are matched to one another, due to the lack of hysteresis effects, even a resistance thermometer 13 with a standards-meeting characteristic curve is to be expected, so that a large part of such resistance thermometers 13 lie in the accuracy class 1/10 B per DIN EN 60751:2009-05.

The invention claimed is:

1. A thin film sensor element for determining temperature, comprising:
   a substrate having a resistive region and a contact region adjoining the resistive region;
   a resistive structure having a temperature-dependent electrical resistance, wherein the resistive structure is disposed in the resistive region, wherein the resistive structure includes a first section having a first branch and a second branch connected in parallel with the first branch, wherein the resistive structure further includes a second section having a first branch and a second branch connected in parallel with the first branch of the second section, wherein a first reference point is formed in the resistive region by the connection of the first branch of the first section with the second branch of the first section, and wherein a second reference point is formed in the resistive region by the connection of the first branch of the second section with the second branch of the second section;
a first intermediate conductor connected to the first branch of the first section in a first contact area;
a second intermediate conductor connected to the second branch of the first section in a second contact area;
a third intermediate conductor connected to the first branch of the second section in a third contact area; and
a fourth intermediate conductor connected to the second branch of the second section in a fourth contact area,
wherein the first contact area, the second contact area, the third contact area, and the fourth contact area are disposed in the contact region and are electrically insulated from one another.

2. The thin film sensor element as claimed in claim 1, wherein the first and/or the second reference point are/is arranged in an end region of the resistive region near the contact region.

3. The thin film sensor element as claimed in claim 1, wherein the first and/or the second reference point are arranged in a region which lies between an end region of the resistive region away from the contact region and an end region of the resistive region near the contact region.

4. The thin film sensor element as claimed in claim 1, wherein the resistive structure is composed of a metal cold conductor.

5. The thin film sensor element as claimed in claim 4, wherein the metal cold conductor includes platinum.

6. The thin film sensor element as claimed in claim 4, wherein the metal cold conductor includes nickel.

7. The thin film sensor element as claimed in claim 1, further comprising:
a first cover layer disposed in the resistive region for covering the resistive structure.

8. The thin film sensor element as claimed in claim 7, further comprising:
a second cover layer disposed in the contact region for covering the four contact areas.

9. The thin film sensor element as claimed in claim 1, wherein a layer thickness of the thin film sensor element in the resistive region is less than a layer thickness of the thin film sensor element in the contact region.

10. The thin film sensor element as claimed in claim 7, wherein a totality of the substrate, the resistive structure and the first cover layer in the resistive region has an effective coefficient of thermal expansion greater than or equal to a coefficient of thermal expansion of the material of the resistive structure as bulk-metal.

11. The thin film sensor element as claimed in claim 1, wherein the substrate is at least partially ceramic.

12. The thin film sensor element as claimed in claim 11, wherein the substrate includes aluminum oxide.

13. The thin film sensor element as claimed in claim 11, wherein the substrate includes zirconium oxide.

14. The thin film sensor element as claimed in claim 12, wherein the substrate further includes zirconium oxide.

15. The thin film sensor element as claimed in claim 1, wherein a surface layer of the substrate is non-conducting, and wherein the non-conducting surface layer of the substrate has a minimum layer thickness of 1 micrometer.

16. The thin film sensor element as claimed in claim 1, wherein the intermediate conductors are composed of the same material.

17. The thin film sensor element as claimed in claim 1, wherein the resistive structure has a layer thickness of 0.1-10.0 micrometers.

18. The thin film sensor element as claimed in claim 8, wherein the first cover layer has a maximum layer thickness of 50 micrometers and the second cover layer has a maximum layer thickness of 2.0 millimeters.

19. A resistance thermometer, comprising:
a thin film sensor element for determining temperature, comprising:
a substrate having a resistive region and a contact region adjoining the resistive region;
a resistive structure having a temperature-dependent electrical resistance, wherein the resistive structure is disposed in the resistive region, wherein the resistive structure includes a first section having a first branch and a second branch connected in parallel with the first branch, wherein the resistive structure further includes a second section having a first branch and a second branch connected in parallel with the first branch of the second section, wherein a first reference point is formed in the resistive region by the connection of the first branch of the first section with the second branch of the first section, and wherein a second reference point is formed in the resistive region by the connection of the first branch of the second section with the second branch of the second section;
a first intermediate conductor connected to the first branch of the first section in a first contact area;
a second intermediate conductor connected to the second branch of the first section in a second contact area;
a third intermediate conductor connected to the first branch of the second section in a third contact area; and
a fourth intermediate conductor connected to the second branch of the second section in a fourth contact area,
wherein the first contact area, the second contact area, the third contact area, and the fourth contact area are disposed in the contact region and are electrically insulated from one another; and
a control/evaluation unit,
wherein the first intermediate conductor, the second intermediate conductor, the third intermediate conductor, and the fourth intermediate conductor are connected with the control/evaluation unit, and
wherein the control/evaluation unit is embodied to operate the thin film sensor element in a four conductor circuit, to ascertain a resistance of the resistive structure between the first reference point and the second reference point, and to determine from the ascertained resistance a temperature present at the resistive structure.

* * * * *